Feb. 28, 1933. H. HEUSSER 1,899,869
GAS ENGINE
Filed Aug. 18, 1931 3 Sheets-Sheet 2

INVENTOR:
Hermann Heusser,
By Sommers-Young.
Attys.

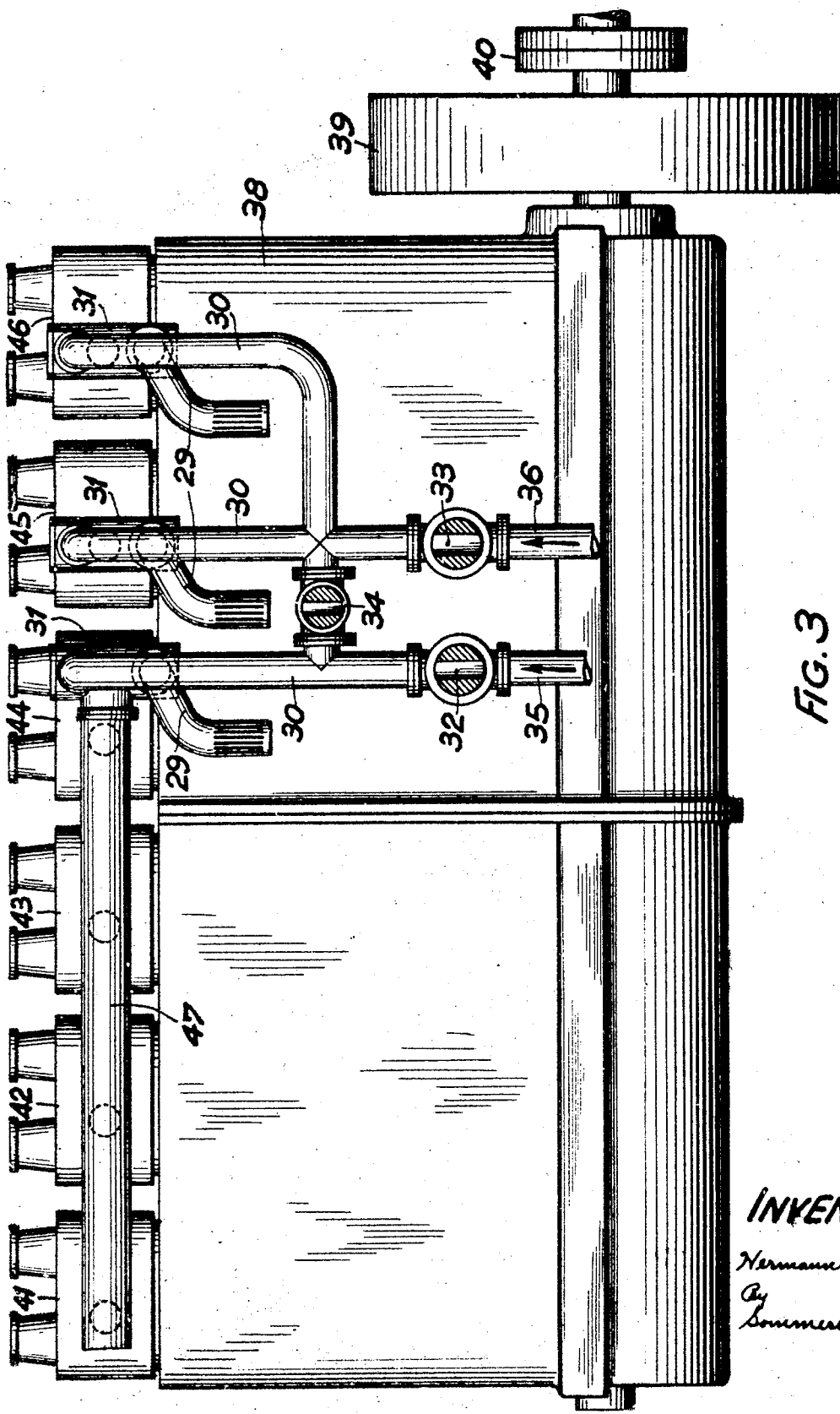

Patented Feb. 28, 1933

1,899,869

UNITED STATES PATENT OFFICE

HERMANN HEUSSER, OF WINTERTHUR, SWITZERLAND, ASSIGNOR TO THE FIRM SCHWEIZERISCHE LOKOMOTIV UND MASCHINENFABRIK, OF WINTERTHUR, SWITZERLAND

GAS ENGINE

Application filed August 18, 1931, Serial No. 557,873, and in Switzerland August 28, 1930.

The invention relates to gas engines and particularly to those gas engines operated by rich gases i. e. having a high calorific power. When gases having a high calorific power are used the regulation of the engine is very delicate and sensitive which involves a complicated and expensive mechanical structure.

According to the present invention the regulation is improved by admixing to the supplied gas a portion of air before it enters the combustion cylinder or cylinders and independent of the subsequent mixture with the main body of the combustion air. This preliminary portion of air is so chosen that after its mixture with the gas a non-explosive mixture is obtained whereby safety against explosion is present in the supply ducts to the combustion cylinder. The relative proportion of air and gas is altered by an adjustable regulating device in accordance with the load on the engine and so that the proportions of gas and air are always below the limit at which an explosive mixture is obtained. The supply of the other combustion air is effected through a separate duct.

Figure 1:
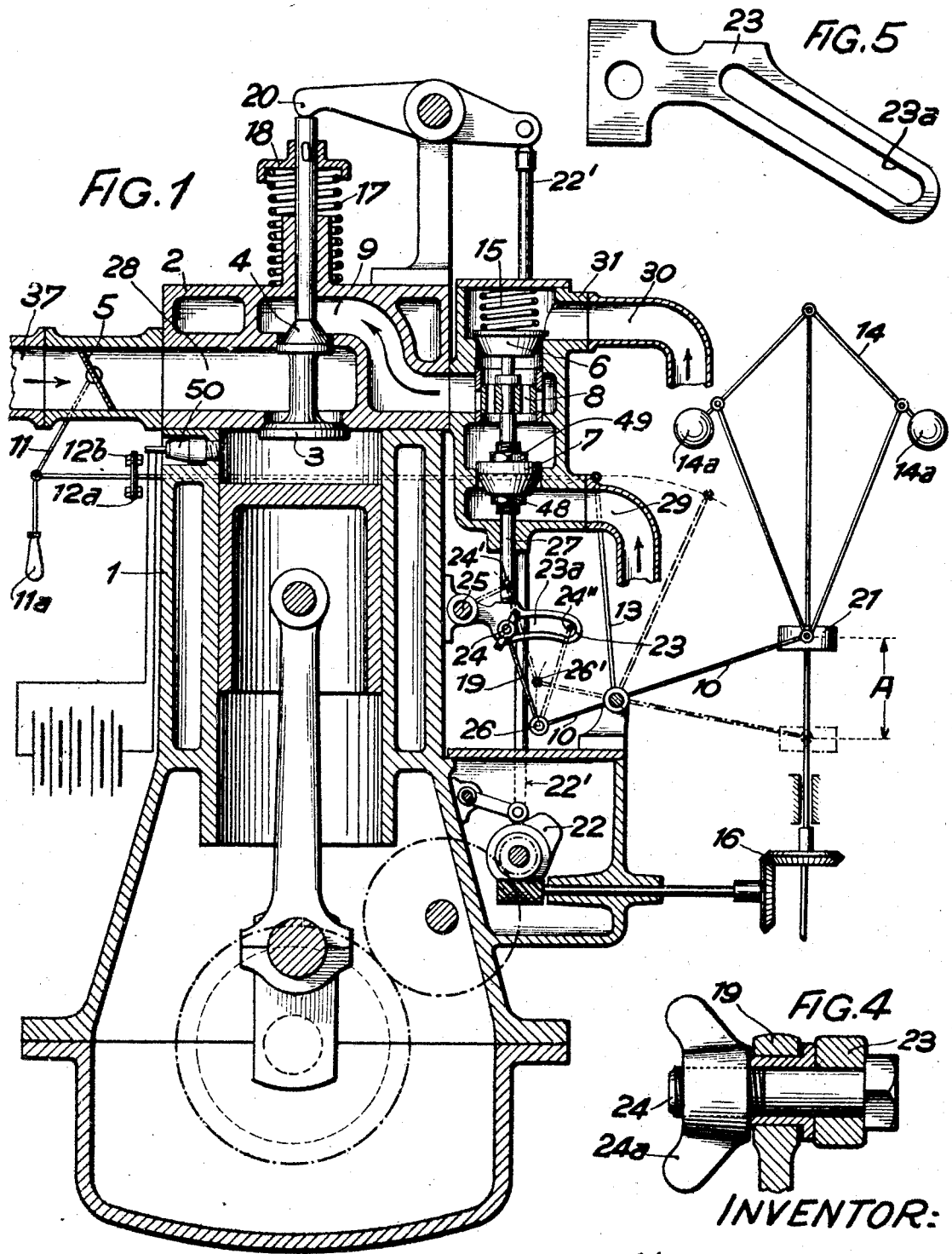
Figure 2:
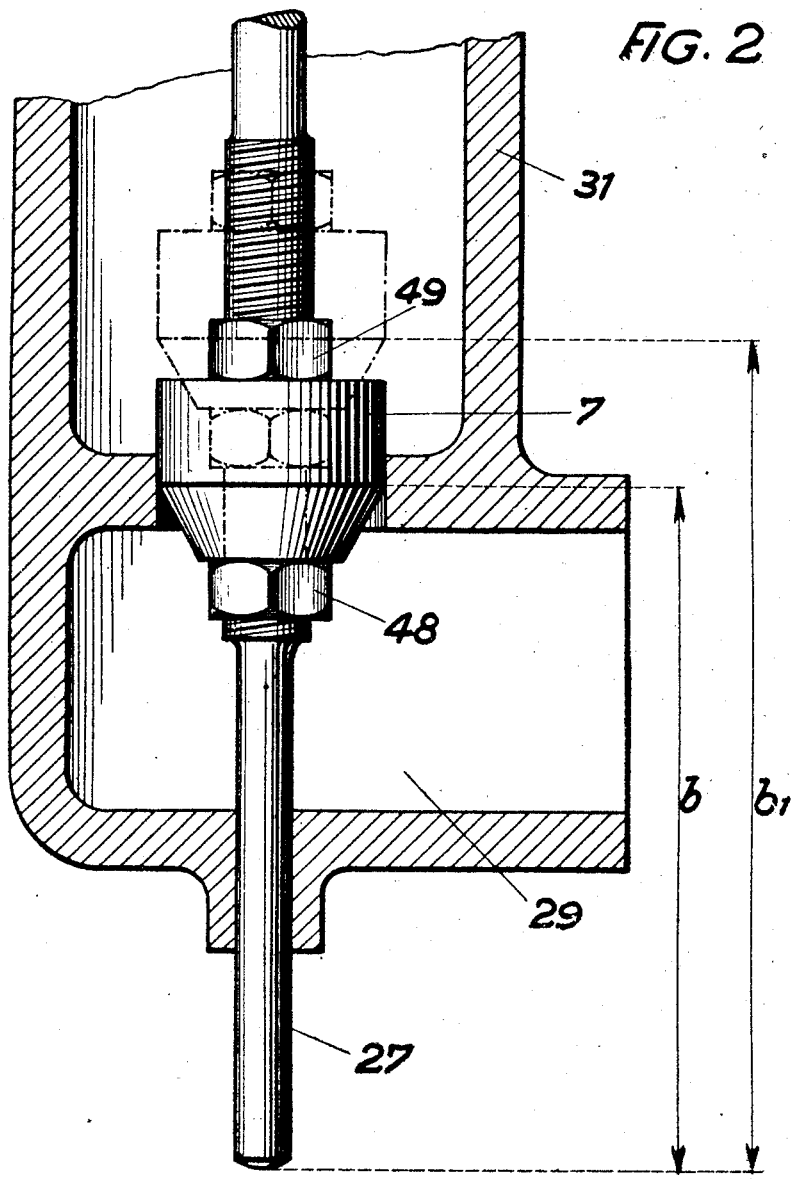
Figure 5A:
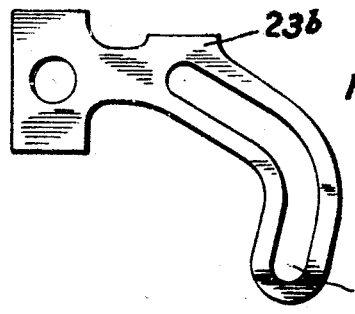

An embodiment of the invention is illustrated by way of example on the accompanying drawings, in which:

Fig. 1 is an axial section of the engine showing cylinder, piston, cylinder cover, gas and air ducts, valves and in a diagrammatic manner the regulating device, Fig. 2 shows a detail of Fig. 1, Fig. 3 illustrates the application of the invention to a multi-cylinder engine and Figs. 4, 5 and 5a show further details.

Referring now to Fig. 1 of the drawings 1 denotes the cylinder of the gas engine, 2 the cylinder cover and 3 the admission valve. Above the valve 3 a further valve 4 is provided. The bulk of the combustion air flows through the duct 37 into the mixing chamber 28; a throttle valve 5 inserted in the duct 37 serves for regulating the quantity of air entering the chamber 28. The throttle valve 5 is controlled by the centrifugal governor 14 through the intermediary of the rods and levers 11, 12 and 13, which are diagrammatically indicated for sake of clearness. The throttle valve 5 may also be actuated manually by the hand lever 11a after the coupling 12a, 12b has been loosened.

The gas supplied from a source not illustrated (for instance from a gasometer, generator or the like) flows through the pipe 30 and the valve 6 into a mixture valve 8 arranged in the valve chamber 31. The preliminary or additional air flows through the pipe 29 and the valve 7 into the mixture valve 8 which is opened to allow the gas-air mixture to flow into the chamber 9 and from there past the valve 4 into the chamber 28 wherein the other air for combustion is added. The valves 6 and 7 are actuated by the governor 14 through the intermediary of the lever 10, rod 19, swinging lever 23 and valve spindle 27. In the illustrated position of the governor 14 both valves 6 and 7 are closed. When the sleeve 21 of the governor moves over the stretch A into the position shown in dotted lines, the end 26 of the double-armed lever 10 moves into the position 26′ and the swinging lever 23 turns about its fulcrum 25 whereby the point 24 gets into the position 24′. Thereby the valve spindle 27 is raised and the valves 6 and 7 are opened to a greater or smaller extent and more or less gas and additional air flows towards the combustion cylinders. The admission valve 3 and the valve 4 are operated in the known manner by cam 22 of the cam shaft, rod 22′ and two-armed lever 20. The spring 17 acting on the cup 18 fixed to the valve spindle tends to hold the valves 3 and 4 in the closed position.

The calorific power of the gas used may vary very much, particularly with gas-engines working in mines, where power gas, blast-furnace gas, natural gas and the like may be used. When using a gas having a high calorific power the gas valve 6 has to be opened less than when using a gas having a low calorific power. To take these differences into account the total stroke of the governor 14 should remain unaltered, however the end 24 of the lever 19 is displaced along the slot 23a of the swinging lever 23. To that end the nut 24a is unscrewed, the end 24 is moved into the desired position and the nut 24a is again tightened. The fulcrum 25 of the swinging lever 23 remains in its fixed position. When the end 24 of the lever 19 is, for instance, displaced into the position 24″ the shaft 27 is lifted by a much smaller amount when the governor sleeve 21 moves over the stretch A. The valves 6 and 7 are therefore less opened. The slotted part 23a may have any shape. For instance it may be curved as a circle having its centre in 26 or according to any other curve, or it may be straight as is illustrated in Fig. 5 or it may be bent as shown by 23b and 23c in Fig. 5a. When a gas having a high calorific value is used the point 24 is shifted to the outer position 24″, with a poor gas to the position 24.

The operation of the afore-described means is as follows:

If the speed of the gas engine drops owing to an increase in the load the weights 14a of the governor and the sleeve 21 move in the downward direction. The end 26 of the double-armed lever 10 is raised, likewise the point 24 and thereby the swinging lever 23. The valve spindle 27 is lifted and the valves are opened to a greater extent so that more gas and additional air is sucked into the gas engine.

The proportion between gas and additional air in the mixture valve 8 may be differently adjusted by displacing the valve 7 for the additional air relatively to the valve 6. This is effected by loosening the nuts 48 and 49, shifting the valve 7 into another position and screwing the nuts 48 and 49 home again, as is shown in detail in Fig. 2. Thereby it is possible to maintain the valve 7 for additional air in the open position when the gas valve 6 is still closed or, vice versa, by a displacement of the air valve 7 in the downward direction the air valve may still be closed when the gas valve is slightly opened. Thus any desired proportions between additional air and gas may be obtained. When the air valve 7 has been displaced into the lowermost position no additional air is admitted to the mixture valve in the lowermost position of the governor sleeve. The admission of additional air is then completely excluded at any load of the engine. When using gases having a very high calorific power the valve 4 would have to be of very small dimensions and the regulation very delicate. By the mixture of additional air to the gas the valve 4 gets ampler dimensions and the regulation is much less delicate and is technically easier to be carried into effect.

The present invention increases the regulability of the engine, the sensitiveness is considerably lowered so that the regulation is more reliable.

The addition of air to the gas according to the invention and in a proportion that the mixture obtained is below the explosive limit may be effected with one cylinder or multi-cylinder gas engines. With multi-cylinder engines separate mixture valves 45, 46 (Fig. 3) may be provided for every cylinder or one group of mixture valves may be provided for the whole engine, or the combustion cylinders may be united to single groups (41—44, Fig. 3) which are supplied by one group of valves. Also in this case the valve for additional air may be inoperative under certain load conditions, as has been explained above. Also with multi-cylinder engines the quantity or the pressure of the other combustion air may be regulated by suitable throttle members, valves, flaps, etc. provided for the whole engine, for single cylinders or for groups of cylinders.

I claim:

1. In a multicylinder gas engine in combination, gas inlet ducts for a gaseous fuel, air inlet ducts for auxiliary air, primary mixing chambers, valves between said mixing chambers and said air ducts, valves between said mixing chambers and said fuel ducts, a governor, said valves operated by said governor for producing a non-explosive gas-air mixture, ducts for the non-explosive gas-air mixture leaving said primary mixing chambers, working pistons, connecting rods, a crankshaft, combustion chambers, main air ducts for combustion air having regulating means inserted therein, secondary mixing chambers, valve means between said secondary mixing chambers and the ducts for the non-explosive air-gas mixture, means for adjusting said latter valves for producing an explosive air-gas mixture, positively operated valves between said secondary mixing chambers and said combustion chambers, and means for igniting said explosive mixture in said combustion chambers.

2. In a multicylinder gas engine in combination, gas inlet ducts for a gaseous fuel, air inlet ducts for auxiliary air, primary mixing chambers, valves between said mixing chambers and said air ducts, valves between said mixing chambers and said fuel ducts, a governor, said valves operated by said governor for producing a non-explosive gas-air mixture, links inserted between said valves and said governor and flexibly connected to each other, slotted levers having one fulcrum point, the end of one lever connected to said slots, means to fix said end of said lever in any position in said slot, ducts for the gas-air mixture leaving said primary mixing chambers, working pistons, connecting rods, a crankshaft, combustion chambers, main air ducts for combustion air having regulating means therein, secondary mixing chambers, valve means between said secondary mixing chambers and the ducts for the non-explosive air-gas mixture, means for adjusting said latter valves for producing an explosive air-gas mixture, positively operated valves between said secondary mixing chambers and said combustion chambers, and means for igniting said explosive mixture in said combustion chambers.

3. In a multicylinder gas engine in combination, gas inlet ducts for a gaseous fuel, air inlet ducts for auxiliary air, primary mixing chambers, valves between said mixing chambers and said air ducts, valves between said mixing chambers and said fuel ducts, a governor, said valves operated by said governor for producing a non-explosive gas-air mixture leaving said primary mixing chambers, working pistons, connecting rods, a crankshaft, combustion chambers, main air ducts for combustion air having regulating means inserted therein, said regulating means operated by said governor, secondary mixing chambers, valve means between said secondary mixing chambers and the ducts for the non-explosive air-gas mixture, means for adjusting said latter valves for producing an explosive air-gas mixture, positively operated valves between said secondary mixing chambers and said combustion chambers, and means for igniting said explosive mixture in said combustion chambers.

4. In a multicylinder gas engine in combination, gas inlet ducts for a gaesous fuel, air inlet ducts for auxiliary air, primary mixing chambers, valves between said mixing chambers and said air ducts, valves between said mixing chambers and said fuel ducts, a valve spindle common to one of said air valves and one of said gas valves, a governor, said valves operated by said governor for producing a non-explosive gas-air mixture, links inserted between said valves and said governor and flexibly connected to each other, slotted levers having one fulcrum point, means for fixing the end of one lever in any position in said slot, ducts for the gas-air mixture leaving said primary mixing chambers, working pistons, connecting rods, a crankshaft, combustion chambers, main air ducts for combustion air having regulating means therein, secondary mixing chambers, valve means between said secondary mixing chambers and the ducts for the non-explosive air-gas mixture, means for adjusting said latter valves for producing an explosive air-gas mixture, positively operated valves between said secondary mixing chambers and said combustion chambers, and means for igniting said explosive mixture in said combustion chambers.

5. In a multiple cylinder gas engine in combination, a fuel inlet, an auxiliary air inlet, a primary mixing chamber, a valve between the said mixing chamber and each of said inlets, means for adjustably opening said valves in accordance with the speed of the engine, means for regulating the opening of one of said valves relative to the opening of the other, a duct from said primary mixing chamber to a secondary mixing chamber, a positively operated valve between said duct and said secondary mixing chamber, a main air inlet to said secondary mixing chamber, regulating means in the main air inlet controlled by the speed of the engine, and a positively operated valve between said secondary mixing chamber and the combustion chamber.

In testimony whereof I have signed my name to this specification.

HERMANN HEUSSER.